(No Model.)
J. S. SELLON.
SECONDARY BATTERY OR ELECTRICAL ACCUMULATOR.
No. 321,759. Patented July 7, 1885.
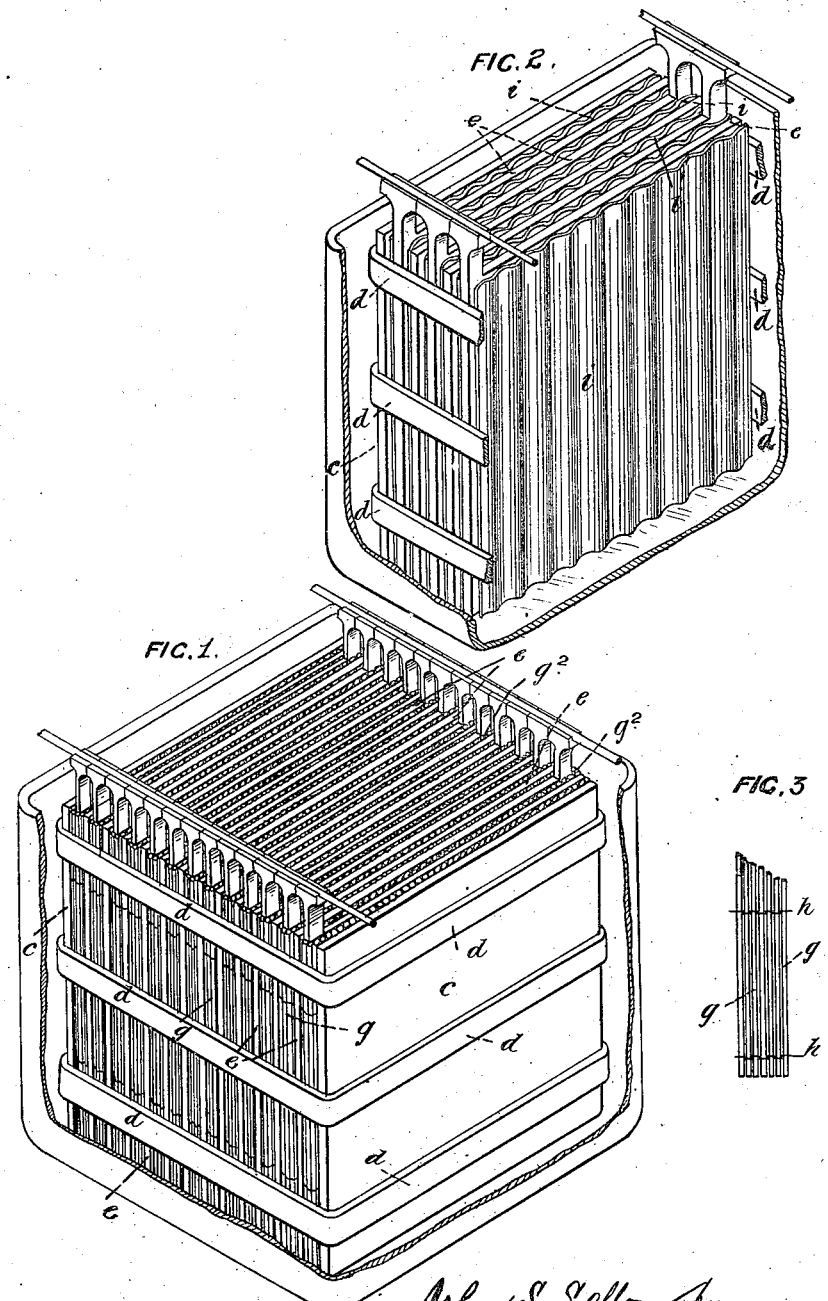

UNITED STATES PATENT OFFICE.

JOHN SCUDAMORE SELLON, OF HATTON GARDEN, COUNTY OF MIDDLESEX, ENGLAND.

SECONDARY BATTERY OR ELECTRICAL ACCUMULATOR.

SPECIFICATION forming part of Letters Patent No. 321,759, dated July 7, 1885.

Application filed March 27, 1884. (No model.) Patented in England December 14, 1883, No. 5,741.

*To all whom it may concern:*

Be it known that I, JOHN SCUDAMORE SELLON, a subject of the Queen of Great Britain and Ireland, and residing at Hatton Garden, in the county of Middlesex, England, have invented certain Improvements in Secondary Batteries or Electrical Accumulators, (for which I have obtained a patent in Great Britain, No. 5,741, dated December 14, 1883,) of which the following is a specification.

My invention relates to improvements in secondary batteries or electrical accumulators composed of plates of lead or other suitable material, which are or which may be roughened, perforated, grooved, corrugated, indented, or cast or manufactured with ridges, flutings, projections, interstices, cells, cavities, or spaces of any kind, and which are or which may be coated, or in any way packed with or have attached on or to them oxides of lead or spongy, precipitated, or reduced lead or other suitable material, composition, or admixture, such plates or packed plates being immersed in cells, vessels, or receptacles containing acidulated water or other suitable electrolyte; and my invention has for one of its objects the maintaining, as hereinafter described, of such plates in shape and throughout equidistantly one from the other, and the avoiding of contacts of the negative and positive plates, either by warping or buckling, or by any way touching one another, or by contacts forming by the oxides or spongy metal, material, or composition which may be employed falling off or out.

My invention also effects great compactness of the batteries, and enables the plates or groups of plates to be more readily handled or packed for transport with greater safety, and also greatly increases the durability of the batteries.

In carrying out my invention I may employ strips of wood, insulite, porous clay, or any other suitable material, separately or framed together in a convenient manner. I clamp the whole together by means of a frame-work extending all round or partly round the plate or number of plates, and made of wood, insulite, stone, or earthenware, or any suitable material, in conjunction with which I may use pieces or bands of india-rubber, or any suitable elastic or binding substance, so as to admit of a certain degree of expansion where desirable; or, I may use an expansible framework—such as thick bands of india-rubber or sufficiently elastic material in conjunction or not with side pieces or frame-work of wood, insulite, or other suitable material; or I may pass rods of wood, insulite, or other suitable material through the plates and disks, or distance-pieces, affixing to the said rods, heads, or ends, and thus clamping the plates together with or without an expanding arrangement, the object to be attained being the adjustment and retention of the plates equidistantly one from the other, at the same time preferably allowing for the expansion in volume of the peroxide or positive pole-plates, so that every plate or portion of every plate may be working under equal conditions to avoid the evil or inconvenience which may arise from undue proximity of one plate or portion of plate to the other, inducing an uneven distribution and irregularity of work in charging and discharging, and bringing about buckling or warping of the peroxidated plates and their consequent speedy destruction.

I prefer to use, for the separation of the plates of whatever shape, whether flat or conical or otherwise, and especially under circumstances when the batteries may be subjected to jolting or shaking—such as when used in tramways or railways—layers of wood, matting, or other similar or suitable material, wrapping the same round, or placing it against, or interposing it between, the plate or plates, so as to separate the positive plates from the negative plates, and then I may clamp the whole together; or I may so fix them in their cells that a suitable amount of pressure is brought to bear upon them by any method of fixing which is preferably elastic, or partially or entirely movable, so as to allow for expansion. I sometimes use such wood matting or other similar or suitable material manufactured with elastic cord in lieu of thread or string, so that it may be spread out or expanded, thus allowing more space for the electrolyte and more play for the gases generated in such batteries; or I may use tiles, or plates of clay, or any suitable material, which is or which may be made of a porous, spongy, or honey-comb form or nature, and which tiles or plates I prefer to have constructed with either flutes, corrugations, or interstices, or perforations, or with two or more of them combined, the object being to give free vent for the gases and to reduce the resistance. Compact blocks of plates may thus be readily formed, which are very convenient for handling or packing, and which may be arranged and connected together, as may be required, in troughs or cells for any required degree of quantity or tension.

For the manufacture of the packed plates of whatever form I prefer to use a comparatively smaller amount of solid metallic lead in or on the negative pole-plate, grid, cone, frame, or support than in or on the peroxide or positive pole-plate, thereby obtaining in the negative pole-plate room for the attachment to or packing on or in of a larger amount of the porous material to be rendered active than in the positive pole plate, and in the said positive pole-plate I prefer to use a larger relative amount of solid metallic lead for the plate, cone, grid, frame for support in order to increase its durability, and a less amount of porous material than in the negative pole-plate. The proportions of active material in the two plates may thus be adjusted relatively with the work required or which can be rendered from each, while the thicker frame of the positive pole-plate increases its durability and strength.

I prefer to make my negative pole-plates somewhat larger—that is, of greater superficial area—than my peroxide plates, so that the relative size becomes more equalized when the positive pole-plates have expanded in course of use. I also may protect portions of the peroxide or positive pole-plates by means of india-rubber or other suitable substance stretched or fixed across in any way on or in contact or in combination with the plates, which may be fitted into grooves or indentations in order to prevent or to minimize the oxidation of the portions so covered or coated, and preserve those portions so far as possible in a metallic condition; or I may protect such portions as I desire by other equivalent means.

In the accompanying drawings, Figure 1 is a representation in perspective of a battery embodying improvements herein described; Fig. 2, a similar view of a somewhat different form of my invention, and Fig. 3 a detail view.

In Fig. 1 the battery-plates $e$ are represented as separated from each other by tiles or plates $i$ of porous corrugated clay or other like material. Side pieces, one of which is shown at $c$, and bands $d$ of india-rubber, are or may be used to bind the whole together. In Fig. 2 the plates are separated by the material herein designated "wood matting," a portion of which material is also shown in Fig. 3. The bars $g$ of this material are fastened together by threads $h$, which are preferably elastic. This material is wrapped around the plates, the whole being bound together by elastic bands, there being side pieces, $c$, as in Fig. 1.

Having now explained the invention and the best manner of carrying the same into effect, I would observe, in conclusion, that I am aware that distance-pieces of various kinds have been interposed between electrodes of secondary batteries; but I am not aware that a matting of stiff strips connected by threads has ever been employed for the purpose. Further, I am aware that another has placed, or proposed to place, the electrodes of a secondary battery each in a cell formed by flanged plates of porous earthenware bound together by cord, which plates were corrugated to give a free circulation of fluids; but in this battery the abutting flanges received the pressure of the clamping means, whereas according to my second improvement the distance-plates are separated from one another at one or both edges, and bear upon the electrodes by any desired degree of pressure, depending upon the force of the clamping means. Finally, I am aware that another has proposed to bind together a number of electrodes with rubber bands; but in his battery the electrodes are to be separated by sponge, which would not answer the purpose of my rigid distance-plates in imparting strength to the electrodes and preventing the same from warping or buckling.

What I claim as my invention, and desire to secure by Letter Patent, is—

1. In a secondary battery, and in combination with positive and negative plates thereof, interposed distance-plates formed of strips of wood or similar stiff non-conducting material connected by threads to form a matting, substantially as described.

2. The combination, with the series of positive and negative plates of a secondary battery and the clamping means for binding them together, of interposed distance-pieces of rigid non-conducting material provided with longitudinal grooves or passages for permitting the escape of the gases, said distance-plates covering the faces of the battery-plates and being separated from one another, so as to bear upon the battery-plates with a degree of pressure depending upon the force of the clamping means, substantially as described.

3. The combination, with the battery-plates, of rigid spacing-pieces interposed between the plates having the parts joined by an elastic connection, substantially as described.

4. A secondary battery or electric accumulator comprising battery-plates, the negative being of larger superficial area than the positive, porous active material, or material to become active, applied thereto, the larger proportion being carried by the negative plates, separating-pieces of rigid non-conducting material, such as specified, and clamping devices, substantially as described.

5. A secondary battery having the negative plates or elements of greater superficial area than the positive plates or elements, and having the larger amount of active material applied thereto, but containing in the frame or support a smaller quantity of solid metallic lead or other material than said positive plates or elements, substantially as described.

In testimony whereof I have signed my name to this specification in the presence of two subscribing witnesses.

JOHN SCUDAMORE SELLON.

Witnesses:
 EDWARD MATTHEY,
 THOMAS BRENTON,
Both of 78 Hatton Garden, London, E. C.